(12) United States Patent
She et al.

(10) Patent No.: US 12,712,368 B2
(45) Date of Patent: Aug. 18, 2026

(54) HVAC-CENTRIC ENERGY HUB SYSTEM

(71) Applicant: Carrier Corporation, Palm Beach Gardens, FL (US)

(72) Inventors: Xu She, Cohoes, NY (US); HanJong Kim, Avon, CT (US); Ismail Agirman, Southington, CT (US); Luis Arnedo, South Glastonbury, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 532 days.

(21) Appl. No.: 18/071,115

(22) Filed: Nov. 29, 2022

(65) Prior Publication Data

US 2023/0178992 A1 Jun. 8, 2023

Related U.S. Application Data

(60) Provisional application No. 63/285,152, filed on Dec. 2, 2021.

(51) Int. Cl.
*H02J 3/38* (2026.01)
*F24F 11/46* (2018.01)
*H02J 3/32* (2006.01)
*H02M 1/10* (2006.01)
*H02J 101/22* (2026.01)
*H02J 105/42* (2026.01)

(52) U.S. Cl.
CPC .............. *H02J 3/381* (2013.01); *F24F 11/46* (2018.01); *H02J 3/32* (2013.01); *H02M 1/10* (2013.01); *H02J 2101/22* (2026.01); *H02J 2105/42* (2026.01)

(58) Field of Classification Search
CPC ..................................................... F24F 5/0046
See application file for complete search history.

(56) References Cited

U.S. PATENT DOCUMENTS

| | | | | |
|---|---|---|---|---|
| 2010/0217651 A1* | 8/2010 | Crabtree | ................ | G06Q 40/04 705/37 |
| 2011/0204720 A1* | 8/2011 | Ruiz | ..................... | B60L 53/305 307/66 |
| 2016/0336572 A1* | 11/2016 | Yoshida | .............. | H01M 50/296 |
| 2017/0133879 A1* | 5/2017 | Eckhardt | ................. | H02J 3/381 |
| 2022/0121235 A1* | 4/2022 | Ise | ..................... | G06Q 30/0206 |
| 2022/0221179 A1* | 7/2022 | Mundy | .................... | F24F 11/30 |

* cited by examiner

*Primary Examiner* — Nathan L Laughlin
(74) *Attorney, Agent, or Firm* — CANTOR COLBURN LLP

(57) ABSTRACT

A method and a system for operating a heating, ventilation, and air conditioning (HVAC) centric energy hub. A power conversion system is configured to condition power and is coupled to an HVAC system, a power grid, an energy storage device, an alternative energy source, and one or more loads. An energy management system is coupled to the power conversion system, the energy management system is configured to manage distribution of power from the power grid, the energy storage device, and the alternative energy source to the one or more loads and is further configured to communicate with energy management systems of other hubs.

16 Claims, 4 Drawing Sheets

HVAC-CENTRIC ENERGY HUB SYSTEM

CROSS-REFERENCE TO RELATED APPLICATIONS

This application claims the benefit of Provisional Application No. 63/285,152 filed Dec. 2, 2021, the disclosure of which is incorporated herein by reference in its entirety.

BACKGROUND

The present disclosure relates to heating, ventilation, and air conditioning (HVAC) system, and more specifically, to an HVAC-centric energy hub.

Power grids are the main source of energy for residential and commercial buildings. With more and more renewable energy and energy storage devices being put into the electrical grid, managing the energy efficiency from the source side is considered as critical. On the other hand, the HVAC system consumes majority of power in a residential or commercial building. Optimizing energy consumption from load side is equally important. There may be a need to provide an integrated solution to efficiently manage and coordinate various power loads and power sources.

BRIEF DESCRIPTION

According to an embodiment, a heating, ventilation, and air conditioning (HVAC) centric energy hub is provided. The hub comprises a power conversion system that is configured to condition power for and is coupled to an HVAC system, a power grid, an energy storage device, an alternative energy source, and one or more loads; and an energy management system coupled to the power conversion system, the energy management system is configured to manage distribution of power from the power grid, the energy storage device, and the alternative energy source to the one or more loads and is further configured to communicate with energy management systems of other hubs.

In addition to one or more of the features described herein, or as an alternative, further embodiments include a power conversion system that further comprises a direct current (DC) interface for connecting DC loads and an alternating current (AC) interface for connecting AC loads.

In addition to one or more of the features described herein, or as an alternative, further embodiments include an energy management system that is further configured to control the power conversion system to provide energy-as-a-service to one or more loads based at least in part on the communication with the energy management system of the other hubs, wherein the other hubs are located remotely from the hub.

In addition to one or more of the features described herein, or as an alternative, further embodiments include a power conversion system that is further configured to provide power to the power grid to supply power to one or more external loads directly connected to the other hubs based at least in part on the communication with the energy management systems of the hubs.

In addition to one or more of the features described herein, or as an alternative, further embodiments include using alternative energy source that is at least one of a solar power system or a wind power system.

In addition to one or more of the features described herein, or as an alternative, further embodiments include using one or more loads that directly connected to the power conversion system is a local load.

In addition to one or more of the features described herein, or as an alternative, further embodiments include an energy storage system that is configured to store energy from at least one of the power grid or the alternative energy source based at least in part on the communication with the energy management system of the other hubs.

In addition to one or more of the features described herein, or as an alternative, further embodiments include using a hub that communicates with other hubs over a communication channel, wherein the communication channel is separate from the power grid.

In addition to one or more of the features described herein, or as an alternative, further embodiments include a power conversion system that is directly coupled to the HVAC system, the alternative energy source, the energy storage device, and the one or more loads.

According to an embodiment, a method for operating a heating, ventilation, and air conditioning (HVAC) centric energy hub is provided. The method comprising managing, by an energy management system of the hub, distribution of power from a power grid, an energy storage device, and an alternative energy source to the one or more loads through a power conversion system; and communicating with energy management systems of other hubs to manage the distribution of power, wherein the power conversion system is configured to condition power for and is directly connected to an HVAC system, the power grid, the energy storage device, the alternative energy source, and the one or more loads.

In addition to one or more of the features described herein, or as an alternative, further embodiments include a power conversion system that further comprises a direct current (DC) interface for connecting DC loads and an alternating current (AC) interface for connecting AC loads.

In addition to one or more of the features described herein, or as an alternative, further embodiments include controlling the power conversion system to provide energy-as-a-service to one or more loads based at least in part on the communication with the energy management system of the other hubs, wherein the other hubs are located remotely from the hub.

In addition to one or more of the features described herein, or as an alternative, further embodiments include providing power, using the power conversion system, to the power grid to supply power to one or more external loads directly connected to the other hubs based at least in part on the communication with the energy management system of the other hubs.

In addition to one or more of the features described herein, or as an alternative, further embodiments include using an alternative energy source is at least one of a solar power system or a wind power system.

In addition to one or more of the features described herein, or as an alternative, further embodiments include directly connecting one or more local loads to the power conversion system.

In addition to one or more of the features described herein, or as an alternative, further embodiments include storing energy, using the energy storage system, from at least one of the power grid or the alternative energy source based at least in part on the communication with the energy management system of the other hubs.

In addition to one or more of the features described herein, or as an alternative, further embodiments include communicating with the other hubs over a communication channel, wherein the communication channel is separate from the power grid.

In addition to one or more of the features described herein, or as an alternative, further embodiments include directly connecting the power conversion system to the HVAC system, the alternative energy source, the energy storage device, and the one or more loads.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

Currently, in residential and commercial buildings heating, ventilation, and air conditioning (HVAC) systems are generally the largest consumer of energy. In today's environment, due to the energy demand of HVAC systems, sufficient power for the operation of the HVAC system only interfaces with and is supplied with power from the power grid. In addition, HVAC systems do not interface with other DC and AC loads of the building but are managed separately.

In conventional applications, the additional loads are connected to outlets that are coupled to an electrical panel that is further connected to the power grid. The HVAC-centric energy hub disclosed herein allows for AC and DC loads to be directly connected to the HVAC-centric energy hub to receive power for the loads, instead of receiving power directly from the grid.

The techniques described herein integrate power solutions within an HVAC-centric energy hub which allows the HVAC-centric energy hub to supply power to additional AC and DC loads that may be attached. The HVAC-centric energy hub is configured to supply energy to both local loads (directly connected to the HVAC-centric energy hub) or external loads such as those loads that are connected to other HVAC-centric energy hubs or systems. In other words, the HVAC-centric energy hub becomes an energy service hub and allows additional loads to be connected to the HVAC-centric energy hub instead of the grid to obtain power for the connected loads. The HVAC-centric energy hub directly interfaces with additional loads through the power conditioning circuit. The HVAC-centric energy hub is also configured to communicate with other HVAC-centric energy hubs to efficiently coordinate the distribution of energy.

Figure 1:
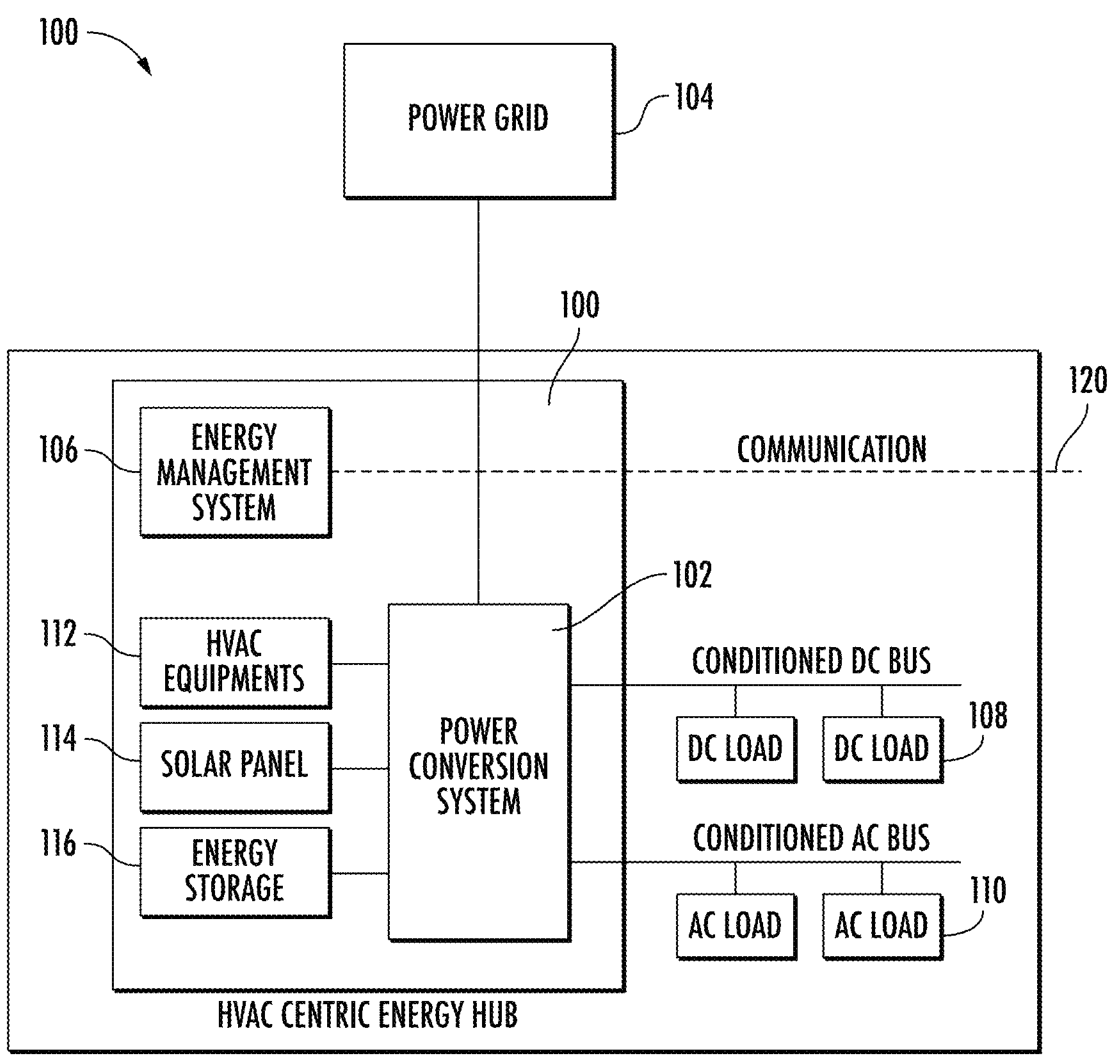
FIG. 1 depicts an example of an HVAC-centric energy hub in accordance with one or more embodiments of the disclosure.

Now referring to FIG. 1, an HVAC-centric energy hub (referred to as "energy hub 100") in accordance with one or more embodiments of the disclosure is provided. The energy hub 100 includes a power conversion system 102 that is electrically coupled to the power grid 104. In one or more embodiments of the disclosure, the power conversion system 102 is electrically coupled to the power grid 104 and is further configured to convert the received power from the power grid 104 for the various AC loads 108 and DC loads 110. In a non-limiting example, the power grid 104 may provide 120 VAC, 240 VAC, etc. The power conversion system 102 can include one or more DC-to-DC converters, AC-to-DC converters, DC-to-AC converters, etc. In addition, each of the converters may be configured to step-up and step-down the power as needed for the various applications. It should be understood that a plurality of converters can be incorporated into the power conversion system 102 and any combination of the different types of converters can be included in the power conversion system.

FIG. 1 also depicts the power conversion system 102 of the energy hub 100 is coupled to an HVAC system 112. The HVAC system 112 can include various HVAC equipment such as but not limited to a heat pump, hot water heating system, and air purifier (not shown). It should be understood that other equipment such as various motors and pumps can be part of the HVAC system 112. FIG. 1 also depicts the power conversion system 102 of the energy hub 100 is also coupled to an alternative energy source such as the solar panel 114. It can be appreciated that other types of alternative energy sources can be integrated within the energy hub 100 such as but not limited to wind energy and other green energy sources. The power conversion system 102 is also coupled to an energy storage 116. The energy storage 116 may include a rechargeable storage system (rechargeable battery systems). Also, it should be understood that a plurality of energy storage devices and/or different types of energy storage devices can be incorporated into the energy hub 100.

FIG. 1 depicts the energy hub 100 includes an energy management system 106 which is configured to manage the supply and distribution of power within the energy hub 100 and to the loads that are electrically connected to the energy hub 100. The energy management system 106 can be configured to manage when power should be supplied to the HVAC system 112 using power from the power grid 104, the solar panel 114, and/or the energy storage 116. Similarly, the energy management system 106 can be configured to determine when the one or more DC loads 108 and AC loads 110 that are directly coupled to the power conversion system 102 is supplied energy originating from the power grid 104, the solar panel 114, and/or the energy storage 116.

The energy management system 106 can be configured to determine the source of power based on various thresholds such as the cost of energy from the power grid 104, the capacity of the stored energy storage 116, the availability of solar or alternative energy, and/or the demand from the HVAC system 112 and/or one or more DC loads 108 and AC loads 110.

Also, the energy management system 106 of the energy hub 100 can be utilized to supply energy to the power grid 104 in an on-demand process (e.g., energy-as-a-service). Various algorithms can be used to determine when to obtain energy from the power grid 104 or used to determine when to supply energy from the solar system or energy storage system to the power grid 104. One energy management system 106 can communicate with the energy management systems 106 of other energy hubs 100. The communication can include but is not limited to the energy capacity or energy demand that is requested for operation. In one or more embodiments of the disclosure, the energy management system 106 can negotiate with other energy management systems 106 to determine when to obtain energy from the power grid 104 or supply power to its loads from its sources. It can be appreciated that any algorithm can be used to control the operation of the energy hub 100.

It is to be understood the energy management system 106 is configured to manage the distribution of power to local loads and coordinate the power with neighboring energy hubs 100, the energy management system 106 can include one or more controllers and/or processors comprising one or more instructions stored thereon to control the distribution of power for local loads and external loads.

Figure 2:
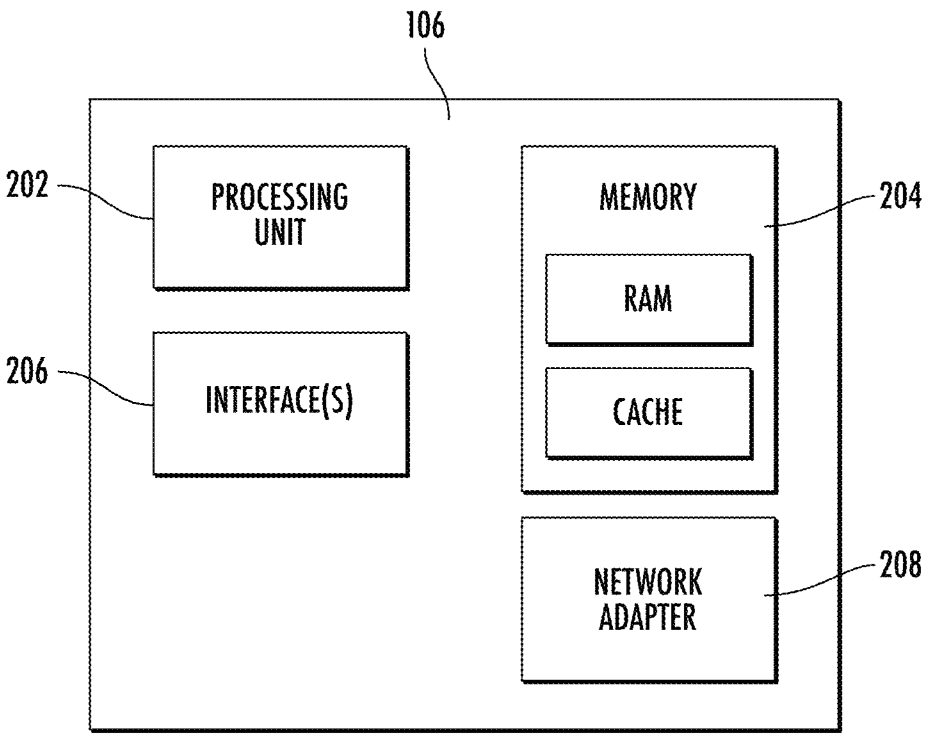
FIG. 2 depicts an example energy management system used in the HVAC-centric energy hub in accordance with one or more embodiments of the disclosure.

Referring now to FIG. 2, in which an exemplary energy management system 106 that is used to implement the embodiments of the present disclosure is shown. The energy management system 106 is only illustrative and is not intended to suggest any limitation as to the scope of use or functionality of embodiments of the invention described herein.

As shown in FIG. 2, energy management system 106 is shown in the form of a general-purpose computing device. The components of energy management system 106 may include, but are not limited to, one or more processors 202, a memory 204, interface 206, and network adapter 208. In one or more embodiments of the disclosure, the processor 202 can include a processor 202 of a general-purpose computer, special purpose computer, or other programmable data processing apparatus configured to execute instruction via the processor of the computer or other programmable data processing apparatus.

The energy management system 106 can include a variety of computer system readable media. Such media may be any available media that is accessible by the energy management system 106, and it includes both volatile and non-volatile media, removable and non-removable media. Memory 204 can include computer system readable media. The memory 204 can include any one or combination of volatile memory elements (e.g., random access memory (RAM, such as DRAM, SRAM, SDRAM, etc.)) and nonvolatile memory elements (e.g., ROM, erasable programmable read-only memory (EPROM), electronically erasable programmable read-only memory (EEPROM), etc.). The energy management system 106 may further include other removable/non-removable, volatile/non-volatile computer system storage media.

The memory 204 may include one or more program modules (not shown) such as operating system(s), one or more application programs, other program modules, and program data. Each of the operating systems, one or more application programs, other program modules, and program data or some combination thereof, may include an implementation of a networking environment. The program modules generally carry out the functions and/or methodologies of embodiments of the invention as described herein.

The energy management system 106 may also communicate with one or more external devices through the interface 206 such as a keyboard, a pointing device, a display, etc.; one or more devices that enable a user to interact with energy management system 106; and/or any devices (e.g., network card, modem, etc.) that energy management system 106 to communicate with one or more other computing devices.

Still yet, the energy management system 106 can communicate with one or more networks such as a local area network (LAN), a general wide area network (WAN), and/or a public network (e.g., the Internet) via network adapter 208. As depicted, network adapter 208 communicates with the other components of the energy management system 106. It should be understood that although not shown, other hardware and/or software components could be used in conjunction with the energy management system 106. It can be appreciated the energy management system 106 can include other components or modules and is not limited by the components shown in FIG. 2.

Figure 3:
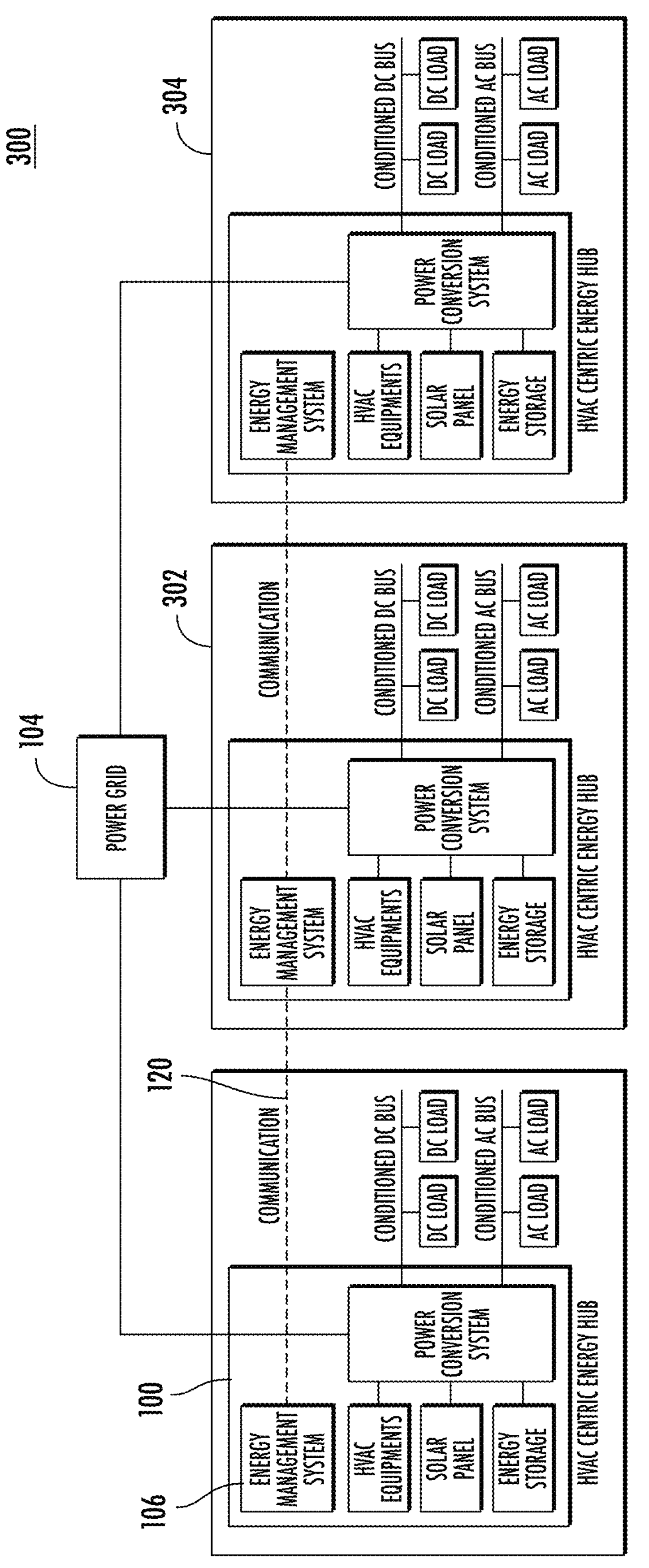
FIG. 3 depicts an exemplary system including a plurality of HVAC-centric energy hub in accordance with one or more embodiments of the disclosure.

FIG. 3 depicts a network 300 of communicatively coupled energy hubs 100, 302, 304 in accordance with one or more embodiments of the disclosure. In one or more embodiments of the disclosure, each energy hub 100, 302, 304 may relay information from one energy hub 100 and forward the received information and its information to another hub. In other embodiments of the disclosure, each of the hubs may be connected over a network and communicated directly with each connected hub. The energy management system 106 is configured to communicate with energy management systems 106 of other energy hubs 302, 304 and may communicate over a network 120. The network(s) 120 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof. As shown, the communication channel over the network 120 is separate from the power grid 104.

The communication between the corresponding energy management system 106 of each of the hubs 100, 302, 304 can be used to negotiate how energy can be supplied from or provided to each of the energy hubs over the power grid 104.

In one or more embodiments of the disclosure, the energy management system 106 can make a determination on the source of power to supply to the HVAC system 112 or the connected loads based on the power demand from the local loads and/or a demand request from neighboring hubs 302, 304. The energy hubs 100, 302, 304 provide energy to both DC loads, AC loads and grids. In such a scenario, the DC loads and AC loads can be electrically coupled to the power conversion system of each hub. Therefore, the DC loads and AC loads are not required to be electrically coupled to a circuit panel of the commercial or residential building to receive power but instead directly interfaces with the energy hub to power the loads.

Figure 4:
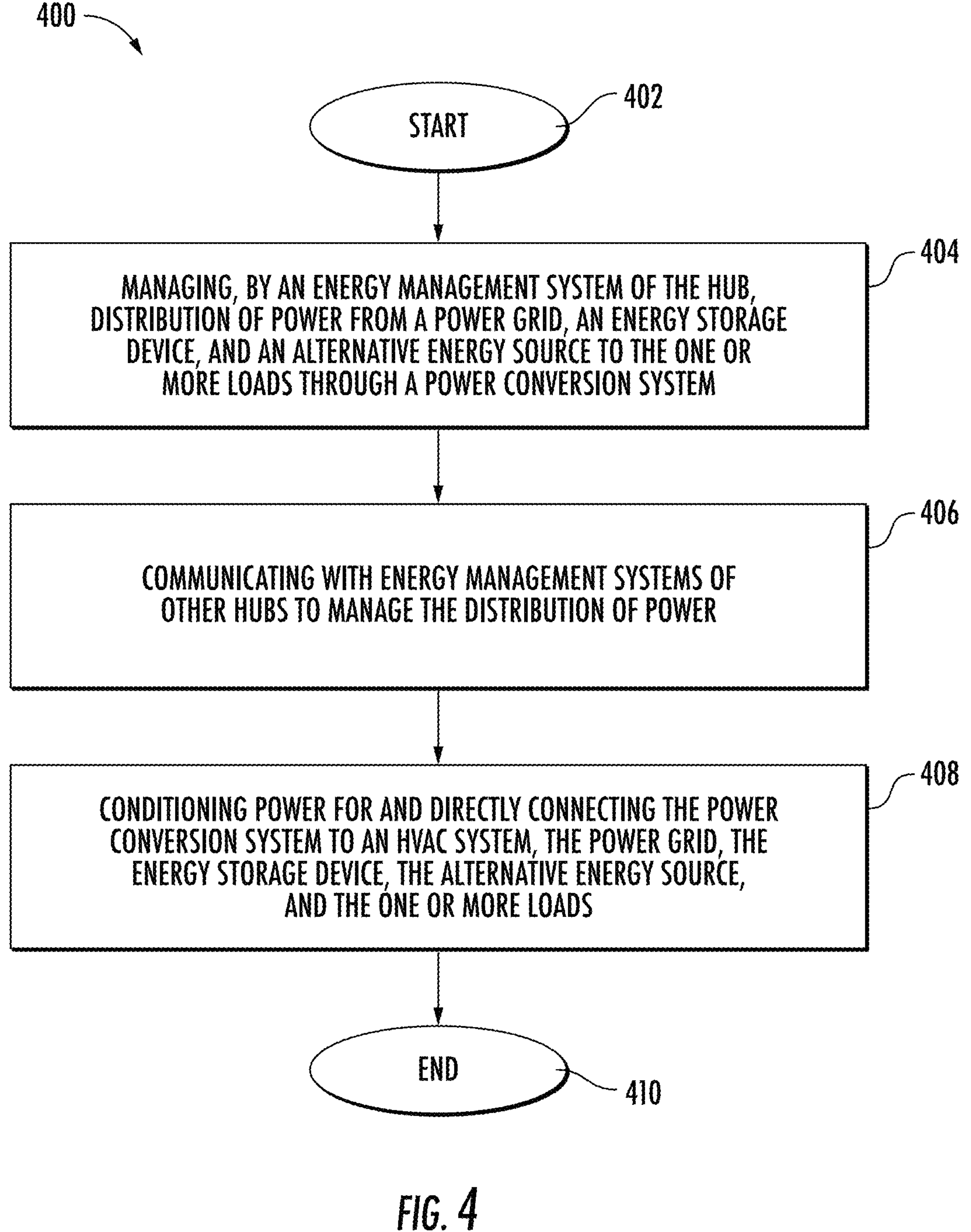
FIG. 4 depicts a flowchart illustrating an exemplary method for operating the HVAC-centric energy hub in accordance with one or more embodiments of the disclosure.

FIG. 4 depicts a flowchart illustrating an exemplary method 400 for operating a hub in accordance with one or more embodiments of the disclosure. The method 400 may be implemented in of the systems shown with reference to FIGS. 1-3. At block 402, the method 400 begins and proceeds to block 404 which provides for managing, by an energy management system of the hub, distribution of power from a power grid, an energy storage device, and an alternative energy source to the one or more loads through a power conversion system.

At block 406, the energy management system of the hub is configured to communicate with the energy management systems of other hubs to manage the distribution of power. In one or more embodiments of the disclosure, the communication with the other hubs occurs over a communication channel, wherein the communication channel is separate from the power grid.

At block 408, the power conversion system is configured to condition power for and is further configured to be directly connected to an HVAC system, the power grid, the energy storage device, the alternative energy source, and the one or more loads. In one or more embodiments of the disclosure, the power conversion system further comprises a direct current (DC) interface for connecting DC loads and an alternating current (AC) interface for connecting AC loads. The local loads are directly connected to the power conversion system.

The energy management system controls the power conversion system to provide energy-as-a-service to one or more loads based at least in part on the communication with the energy management system of the other hubs, wherein the other hubs are located remotely from the hub. The power conversion system provides the power to the power grid to supply power to one or more external loads directly connected to the other hubs and the energy is stored in the energy storage system, from the power grid or the alternative energy source based on the communication with the energy management system of the other hubs.

The method 400 ends at block 410. The process flow diagram of FIG. 4 is not intended to indicate that the operations of the method 400 are to be executed in any particular order, or that all of the operations of the method 400 are to be included in every case. Additionally, the method 400 can include any suitable number of additional operations.

The technical effects and benefits include an HVAC-centric energy hub that increases flexibility by providing an energy-as-a-service feature to locally connected loads and externally collected loads. Current systems are unable to communicate directly with other energy hubs that are remotely located in other commercial or residential buildings and the techniques provided herein provide a flexible integrated solution to efficiently coordinate the management of energy loads.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A heating, ventilation, and air conditioning (HVAC) centric energy hub at a residential building or a commercial building, the hub comprising:

a power conversion system that is configured to condition power for and is coupled to an HVAC system, a power grid, an energy storage device, an alternative energy source, and one or more loads; and an energy management system coupled to the power conversion system, the energy management system is configured to manage distribution of power from the power grid, the energy storage device, and the alternative energy source to the one or more loads and is further configured to communicate with at least one other hub at a residential building or a commercial building, the at least one other hub including a power conversion system and an energy management system;

wherein the energy management system is further configured to control the power conversion system to provide energy-as-a-service to one or more loads based at least in part on the communication with the energy management system of the at least one other hub, wherein the at least one other hub is located remotely from the hub;

wherein the power conversion system is further configured to provide power to the power grid to supply power to one or more external loads directly connected to the at least one other hub based at least in part on the communication with the energy management system of the at least one other hub;

wherein the at least one other hub includes:

a further power conversion system that is configured to condition power for and is coupled to a further HVAC system, the power grid, a further energy storage device, a further alternative energy source, and one or more further loads; and a further energy management system coupled to the further power conversion system.

2. The hub of claim 1, wherein the power conversion system further comprises a direct current (DC) interface for connecting DC loads and an alternating current (AC) interface for connecting AC loads.

3. The hub of claim 1, wherein the alternative energy source is at least one of a solar power system or a wind power system.

4. The hub of claim 1, wherein the one or more loads directly connected to the power conversion system is a local load.

5. The hub of claim 1, wherein the energy storage system is configured to store energy from at least one of the power grid or the alternative energy source based at least in part on the communication with the energy management system of the at least one other hub hubs.

6. The hub of claim 1, wherein the hub communicates with at least one other hub over a communication channel, wherein the communication channel is separate from the power grid.

7. The hub of claim 1, wherein the power conversion system is directly coupled to the HVAC system, the alternative energy source, the energy storage device, and the one or more loads.

8. The hub of claim 1, further comprising heating, ventilation, and air conditioning (HVAC) equipment integrated with the power conversion system, the energy storage device and the energy management system.

9. A method for operating a heating, ventilation, and air conditioning (HVAC) centric energy hub at a residential building or a commercial building, the method comprising:

managing, by an energy management system of the hub, distribution of power from a power grid, an energy storage device, and an alternative energy source to the one or more loads through a power conversion system;

communicating with at least one other hub at a residential building or a commercial building, the at least one other hub including a power conversion system and an energy management system, to manage the distribution of power, and wherein the power conversion system is configured to condition power for and is directly connected to an HVAC system, the power grid, the energy storage device, the alternative energy source, and the one or more loads;

the method further comprising controlling the power conversion system to provide energy-as-a-service to one or more loads based at least in part on the communication with the energy management system of the at least one other hub, wherein the at least one other hub is located remotely from the hub;

the method further comprising providing power, using the power conversion system, to the power grid to supply power to one or more external loads directly connected to the other hubs based at least in part on the communication with the energy management system of the at least one other hub;

wherein the at least one other hub includes:

a further power conversion system that is configured to condition power for and is coupled to a further HVAC system, the power grid, a further energy storage device, a further alternative energy source, and one or more further loads; and a further energy management system coupled to the further power conversion system.

10. The method of claim 9, wherein the power conversion system further comprises a direct current (DC) interface for connecting DC loads and an alternating current (AC) interface for connecting AC loads.

11. The method of claim 9, wherein the alternative energy source is at least one of a solar power system or a wind power system.

12. The method of claim 9, further comprising directly connecting one or more local loads to the power conversion system.

13. The method of claim 9, further comprising storing energy, using the energy storage system, from at least one of the power grid or the alternative energy source based at least in part on the communication with the energy management system of the at least one other hub.

14. The method of claim 9, further comprising communicating with the at least one other hub over a communication channel, wherein the communication channel is separate from the power grid.

15. The method of claim 9, further comprising directly connecting the power conversion system to the HVAC system, the alternative energy source, the energy storage device, and the one or more loads.

16. A heating, ventilation, and air conditioning (HVAC) centric energy hub at a residential building or a commercial building, the hub comprising:

a power conversion system that is configured to condition power for and is coupled to an HVAC system, a power grid, an energy storage device, and one or more loads; and an energy management system coupled to the power conversion system, the energy management system is configured to manage distribution of power from the power grid and the energy storage device to the one or more loads and is further configured to communicate with at least one other hub at a residential building or a commercial building, the at least one other hub including a power conversion system and an energy management system;

wherein the energy management system is further configured to control the power conversion system to provide energy-as-a-service to one or more loads based at least in part on the communication with the energy management system of the at least one other hub, wherein the at least one other hub is located remotely from the hub;

wherein the power conversion system is further configured to provide power to the power grid to supply power to one or more external loads directly connected to the at least one other hub based at least in part on the communication with the energy management system of the at least one other hub;

wherein the at least one other hub includes:

a further power conversion system that is configured to condition power for and is coupled to a further HVAC system, the power grid, a further energy storage device, and one or more further loads; and a further energy management system coupled to the further power conversion system.

* * * * *